(12) United States Patent
Chen

(10) Patent No.: US 9,883,100 B2
(45) Date of Patent: Jan. 30, 2018

(54) IMAGE PROCESSING METHOD AND IMAGE PROCESSING DEVICE FOR GENERATING RECTANGULAR MASK IN IMAGE ACCORDING TO DIFFERENT FIELD OF VIEWS

(71) Applicant: VIVOTEK INC., New Taipei (TW)

(72) Inventor: Chih-Chiang Chen, New Taipei (TW)

(73) Assignee: VIVOTEK INC., New Taipei (TW)

( * ) Notice: Subject to any disclaimer, the term of this patent is extended or adjusted under 35 U.S.C. 154(b) by 174 days.

(21) Appl. No.: 14/940,166

(22) Filed: Nov. 13, 2015

(65) Prior Publication Data

US 2016/0173766 A1   Jun. 16, 2016

(30) Foreign Application Priority Data

Dec. 16, 2014 (TW) .............................. 103143926 A

(51) Int. Cl.
*H04N 5/232* (2006.01)
*G06T 3/00* (2006.01)

(52) U.S. Cl.
CPC ......... *H04N 5/23229* (2013.01); *G06T 3/005* (2013.01); *H04N 5/23216* (2013.01)

(58) Field of Classification Search
CPC ............... H04N 5/232; H04N 5/23296; H04N 5/23206; H04N 7/18; G08B 13/19686
See application file for complete search history.

(56) References Cited

U.S. PATENT DOCUMENTS

| 8,098,282 | B2 | 1/2012 | Gopinath |
| 8,721,197 | B2 | 5/2014 | Miyahara |
| 2003/0227555 | A1 | 12/2003 | Kobayashi |
| 2005/0270371 | A1 | 12/2005 | Sablak |
| 2006/0158527 | A1 | 7/2006 | Kang |
| 2012/0105702 | A1* | 5/2012 | Kogure ................. H04N 5/772 348/333.02 |
| 2013/0070092 | A1* | 3/2013 | Miyahara ............... H04N 5/232 348/143 |

FOREIGN PATENT DOCUMENTS

TW          201146016          12/2011

\* cited by examiner

*Primary Examiner* — Daniel M Pasiewicz
*Assistant Examiner* — Selam Gebriel
(74) *Attorney, Agent, or Firm* — Winston Hsu

(57) ABSTRACT

An image processing method includes steps of obtaining a first image under a first field of view; generating a first rectangular mask in the first image; converting first X-Y plane coordinates of four end points of the first rectangular mask into spherical coordinates; obtaining a second image under a second field of view; converting the spherical coordinates into second X-Y plane coordinates corresponding to the second image; determining whether the second X-Y plane coordinates of the end points all are located in the second image; and if the second X-Y plane coordinates of the end points all are located in the second image, generating a second rectangular mask in the second image by a maximum X coordinate value, a maximum Y coordinate value, a minimum X coordinate value and a minimum Y coordinate value of the second X-Y plane coordinates of the end points.

8 Claims, 9 Drawing Sheets

IMAGE PROCESSING METHOD AND IMAGE PROCESSING DEVICE FOR GENERATING RECTANGULAR MASK IN IMAGE ACCORDING TO DIFFERENT FIELD OF VIEWS

BACKGROUND OF THE INVENTION

1. Field of the Invention

The invention relates to an image processing method and an image processing device and, more particularly, to an image processing method and an image processing device capable of generating an appropriate rectangular mask in an image according to different field of views.

2. Description of the Prior Art

A privacy mask is an important and necessary function for surveillance application. In a fixed camera, the prior art paints a privacy area in an image directly to generate the privacy mask. For a Pan Tilt Zoom (PTZ) camera, the position and/or size of the privacy area will change based on user or system control. If the position and/or size of the privacy mask in the image do not change correspondingly, the privacy area will be exposed in the image and it will disturb the user. Furthermore, when a part of the privacy area exceeds the image due to the change of the field of view, an algorithm for generating the privacy mask will become complicated and then increase computation load.

SUMMARY OF THE INVENTION

An objective of the invention is to provide an image processing method and an image processing device capable of generating an appropriate rectangular mask in an image according to different field of views, so as to solve the aforesaid problems.

According to an embodiment of the invention, an image processing method comprises steps of obtaining a first image captured by a camera unit under a first field of view; generating a first rectangular mask in the first image, wherein the first rectangular mask has four end points and four boundaries connecting the four end points; converting first X-Y plane coordinates of the four end points in the first image into spherical coordinates; obtaining a second image captured by the camera unit under a second field of view; converting the spherical coordinates into second X-Y plane coordinates corresponding to the second image; determining whether the second X-Y plane coordinates of the four endpoints all are located in the second image; and if the second X-Y plane coordinates of the four end points all are located in the second image, generating a second rectangular mask in the second image by a maximum X coordinate value, a maximum Y coordinate value, a minimum X coordinate value and a minimum Y coordinate value of the second X-Y plane coordinates of the four end points.

According to another embodiment of the invention, an image processing device comprises an image obtaining unit, a mask generating unit and an image processing unit, wherein the image processing unit is electrically connected to the image obtaining unit and the mask generating unit. The image obtaining unit obtains a first image captured by a camera unit under a first field of view. The mask generating unit generates a first rectangular mask in the first image, wherein the first rectangular mask has four end points and four boundaries connecting the four end points. The image processing unit converts first X-Y plane coordinates of the four end points in the first image into spherical coordinates. The image obtaining unit obtains a second image captured by the camera unit under a second field of view. The image processing unit converts the spherical coordinates into second X-Y plane coordinates corresponding to the second image and determines whether the second X-Y plane coordinates of the four end points all are located in the second image. If the second X-Y plane coordinates of the four end points all are located in the second image, the image processing unit generates a second rectangular mask in the second image by a maximum X coordinate value, a maximum Y coordinate value, a minimum X coordinate value and a minimum Y coordinate value of the second X-Y plane coordinates of the four end points.

After the field of view changes, the invention determines whether the four end points of the rectangular mask all are located in the image, so as to generate the appropriate rectangular mask in the image. If the X-Y plane coordinates of the four end points all are located in the image, the invention generates the rectangular mask in the image by the maximum X coordinate value, the maximum Y coordinate value, the minimum X coordinate value and the minimum Y coordinate value of the X-Y plane coordinates of the four endpoints. Furthermore, if at least one out-of-bounds point exists, the invention finds out at least one boundary point located in the image and close to the at least one out-of-bounds point and then generates the rectangular mask in the image by the maximum X coordinate value, the maximum Y coordinate value, the minimum X coordinate value and the minimum Y coordinate value of the X-Y plane coordinates of the at least one boundary point and at least one in-bounds point. Accordingly, the invention can generate the appropriate rectangular mask in the image according to different field of views.

Still further, if the mask border of the rectangular mask does not overlap with the nearby image border of the image, the invention can further enlarge the rectangular mask to make the mask border of the rectangular mask overlap with the nearby image border of the image. Accordingly, when a part of the privacy area exceeds the image due to the change of the field of view, the invention still can ensure that the privacy area is not exposed around the border of the image.

Moreover, the invention can sample the four boundaries of the rectangular mask by the fixed distance or different distances, so as to obtain the boundary points. Accordingly, the invention can further reduce computation load and save memory capacity.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
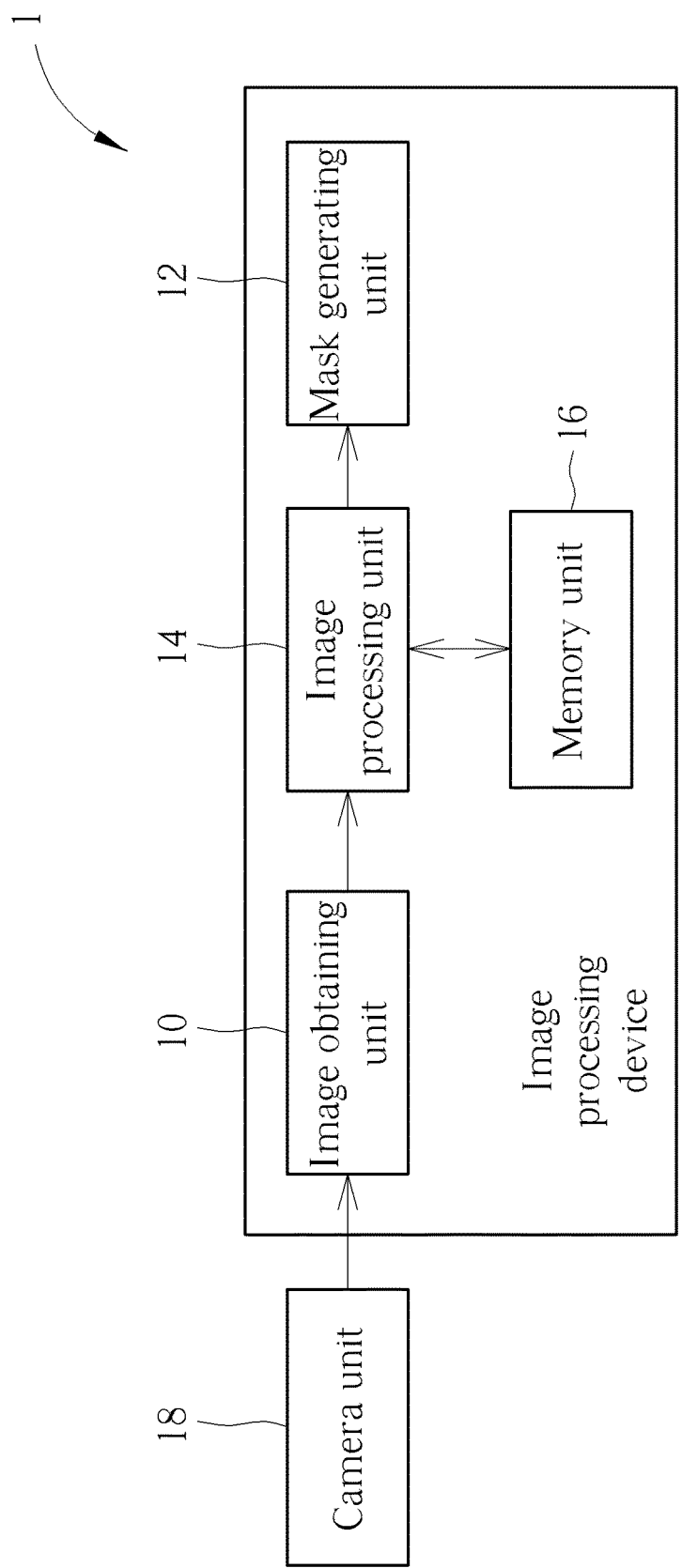
FIG. 1 is a functional block diagram illustrating an image processing device according to an embodiment of the invention.
Figure 2:
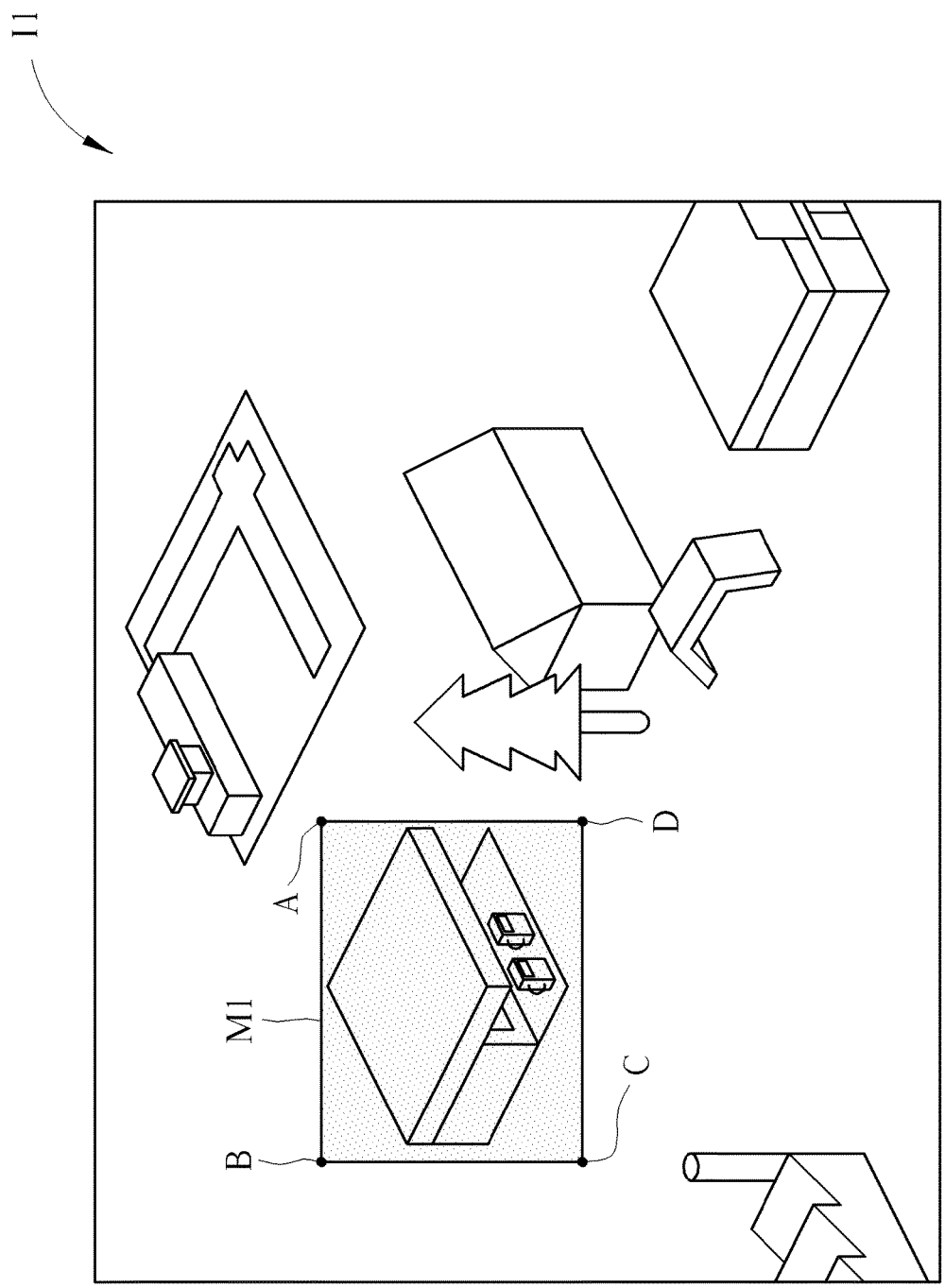
FIG. 2 is a schematic diagram illustrating a first image captured by the camera unit shown in FIG. 1 under a first field of view.
Figure 3:
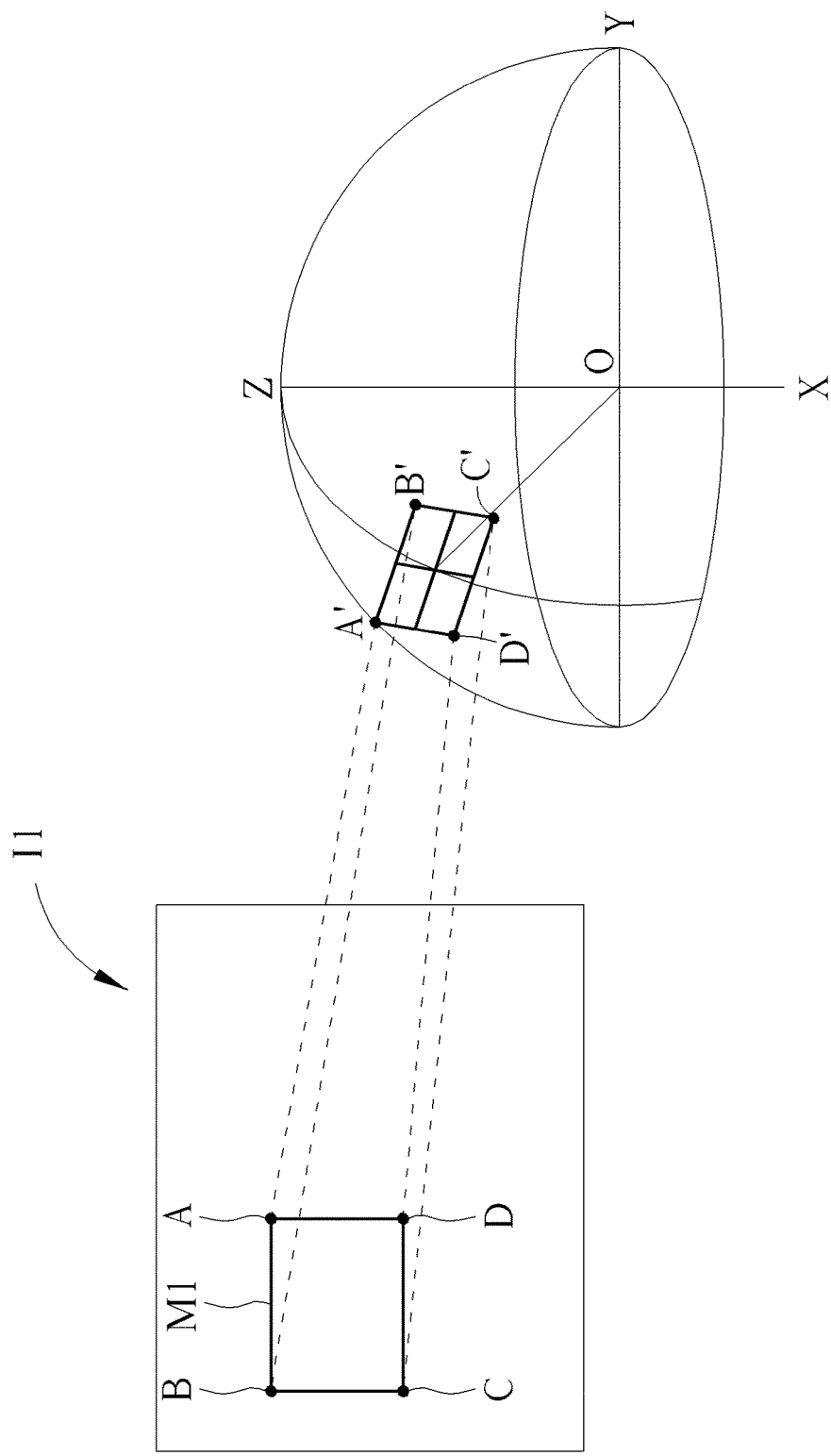
FIG. 3 is a schematic diagram illustrating the X-Y plane coordinates of the four end points of the first rectangular mask shown in FIG. 2 being converted into the spherical coordinates.
Figure 4:
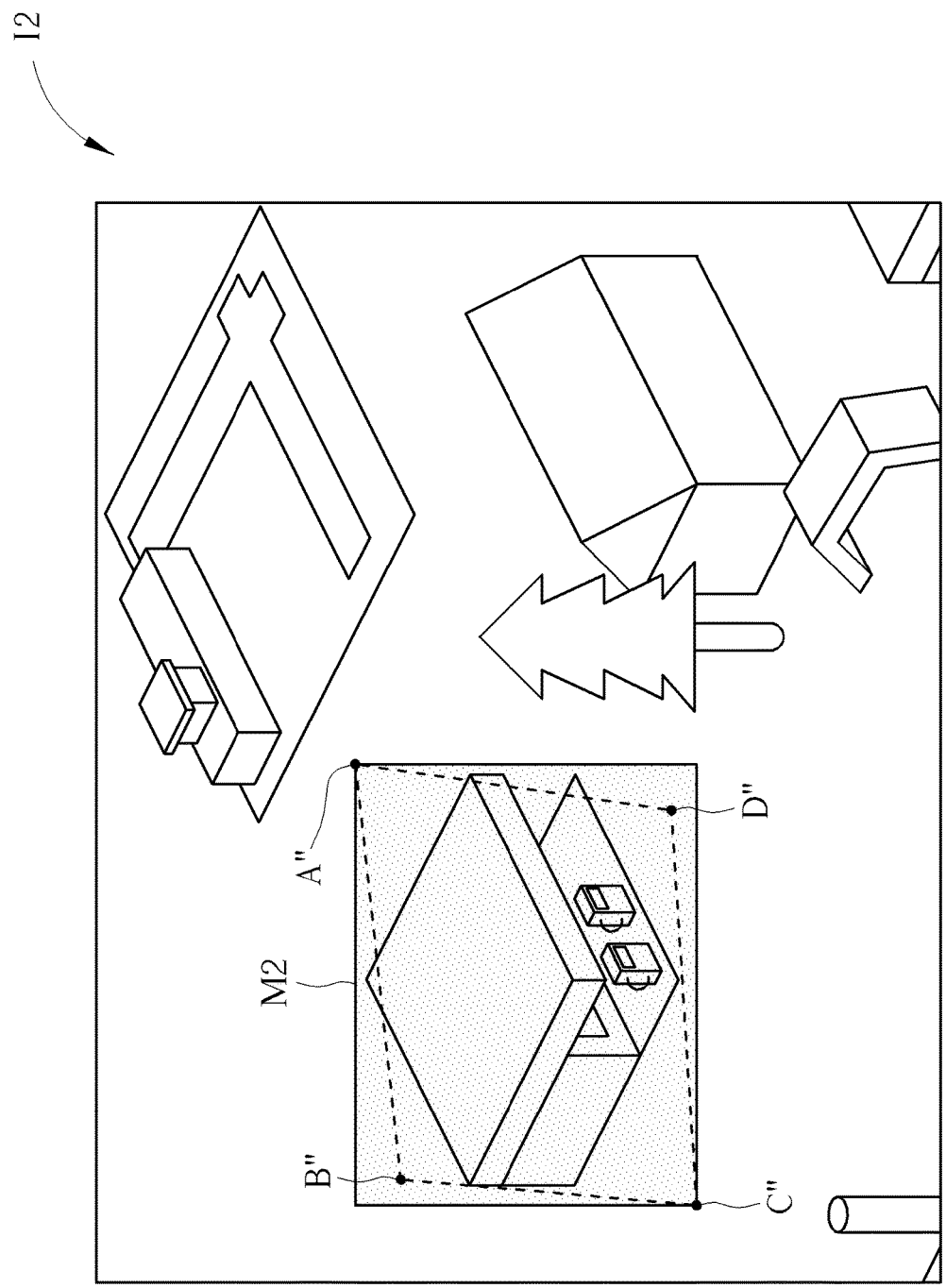
FIG. 4 is a schematic diagram illustrating a second image captured by the camera unit shown in FIG. 1 under a second field of view.
Figure 5:
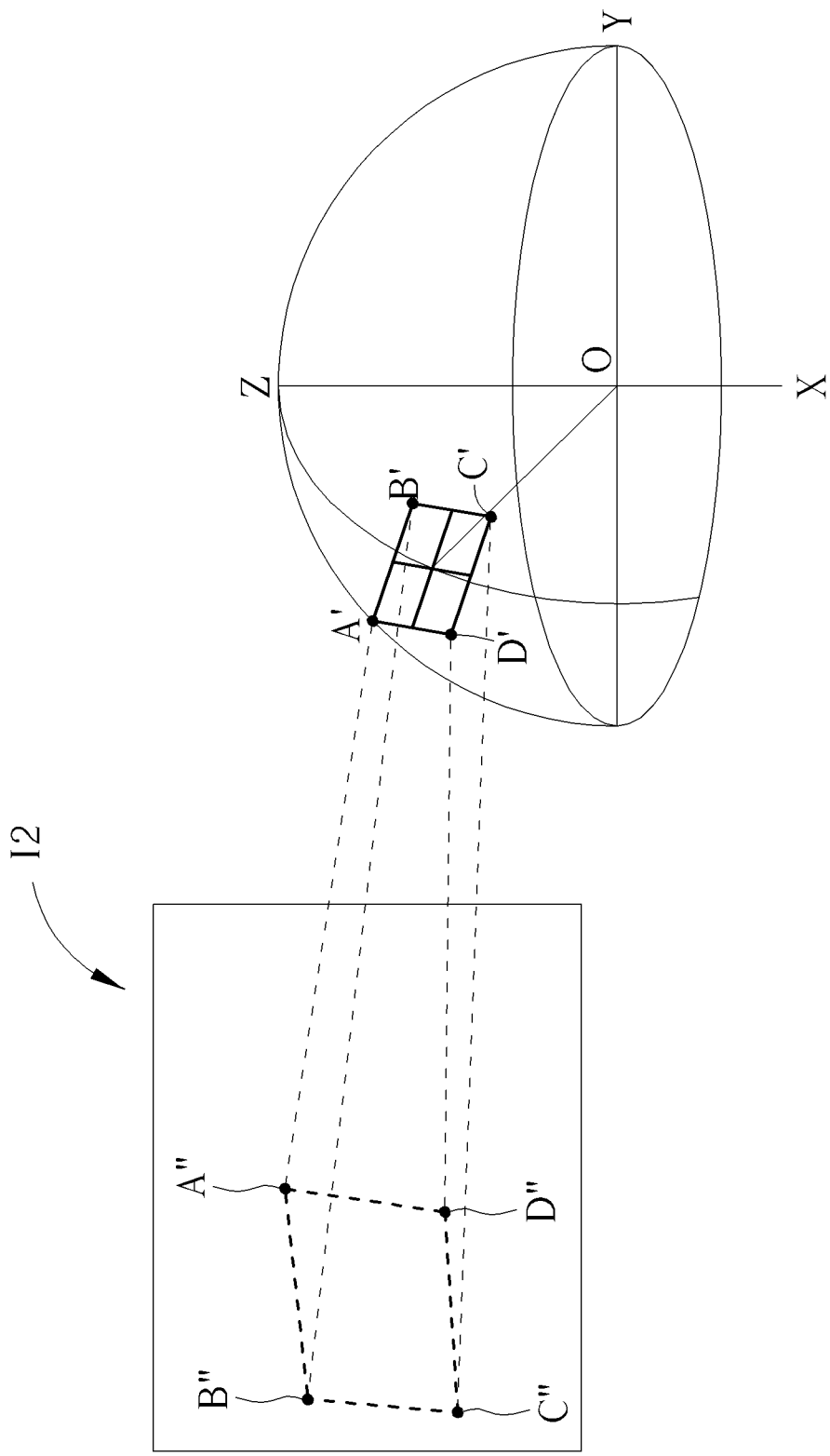
FIG. 5 is a schematic diagram illustrating the spherical coordinates of the four end points shown in FIG. 3 being converted into the second X-Y plane coordinates corresponding to the second image shown in FIG. 4.

Referring to FIGS. 1 to 5, FIG. 1 is a functional block diagram illustrating an image processing device 1 according to an embodiment of the invention, FIG. 2 is a schematic diagram illustrating a first image I1 captured by the camera unit 18 shown in FIG. 1 under a first field of view, FIG. 3 is a schematic diagram illustrating the X-Y plane coordinates of the four end points A, B, C, D of the first rectangular mask M1 shown in FIG. 2 being converted into the spherical coordinates, FIG. 4 is a schematic diagram illustrating a second image I2 captured by the camera unit 18 shown in FIG. 1 under a second field of view, and FIG. 5 is a schematic diagram illustrating the spherical coordinates of the four end points A', B', C', D' shown in FIG. 3 being converted into the second X-Y plane coordinates corresponding to the second image I2 shown in FIG. 4.

As shown in FIG. 1, the image processing device 1 comprises an image obtaining unit 10, a mask generating unit 12, an image processing unit 14 and a memory unit 16, wherein the image processing unit 14 is electrically connected to the image obtaining unit 10, the mask generating unit 12 and the memory unit 16. The image processing device 1 may be applied to a camera, a monitor or other electronic devices with pan, tilt and zoom function. The image obtaining unit 10 can obtain a first image I1 captured by a camera unit 18 under a first field of view, as shown in FIG. 2. The camera unit 18 may be a camera, a monitor or a light sensing component of other electronic devices with camera function. For example, the camera unit 18 may be a charge coupled device (CCD) or a complementary metal-oxide-semiconductor (CMOS) light sensing component for capturing images and then converting the images into digital data. Furthermore, the image processing unit 14 may be a processor or a controller with data processing/calculation function and the memory unit 16 may be a memory or other data storage devices.

After the image obtaining unit 10 obtains the first image I1 captured by the camera unit 18 under the first field of view, a user can set a first rectangular mask M1 for a specific area in the first image I1 through a graphical user interface, so as to use the first rectangular mask M1 to mask the specific area in the first image I1. After the user sets the first rectangular mask M1, the mask generating unit 12 will generate the first rectangular mask M1 in the first image I1, wherein the first rectangular mask M1 has four end points A, B, C, D and four boundaries $\overline{AB}$, $\overline{BC}$, $\overline{CD}$, $\overline{DA}$ connecting the four end points A, B, C, D. Afterward, the image processing unit 14 converts first X-Y plane coordinates of the four end points A, B, C, D in the first image I1 into spherical coordinates. As shown in FIG. 3, the four end points A, B, C, D correspond to four end points A', B', C', D' of the spherical coordinate system, respectively, wherein the spherical coordinates of the four end points A', B', C', D' are absolute coordinates on the camera unit 18. At the same time, the image processing unit 14 stores the spherical coordinates of the four end points A', B', C', D' in the memory unit 16.

Then, the user can manually control the camera, the monitor or other electronic devices with camera function to perform pan, tilt and/or zoom operation, so as to switch the camera unit 18 from the first field of view to a second field of view. Needless to say, the camera, the monitor or other electronic devices with camera function may perform pan, tilt and/or zoom operation automatically according to user pre-defined setting or through object detection, so as to switch the camera unit 18 from the first field of view to a second field of view. After switching the camera unit 18 from the first field of view to the second field of view, the image obtaining unit 10 will obtain a second image 12 captured by the camera unit 18 under the second field of view, as shown in FIG. 4. Then, the image processing unit 14 will convert the spherical coordinates of the four end-points A', B', C', D', which are stored in the memory unit 16, into second X-Y plane coordinates corresponding to the second image I2. As shown in FIG. 5, the four end points A', B', C', D' correspond to four end points A", B", C", D" in the second image I2, respectively.

The aforesaid conversion between the X-Y plane coordinates and the spherical coordinates may be implemented according to, but not limited to, related equations recited in U.S. Pat. No. 8,098,282. The related formulas described in U.S. Pat. No. 8,098,282 translates image X-Y plane coordinate $(X_1, Y_1)$ to absolute angular coordinate $(\theta_1, \Phi_1)$, and the '282 patent mentioned that $(H_{FOV}, V_{FOV})$ (Horizontal/Vertical Field of View) are known parameters. $(H_{FOV}, V_{FOV})$ relate to camera zoom position and decide the visible range of the scene on the image. If we consider this, the absolute angular coordinate system brings the concept of spherical coordinate system in. We may define the absolute angular coordinate system as $(\theta, \Phi)$. The spherical coordinate system described in the invention merely adds a range (distance) limit to the absolute angular coordinate system, $(\theta, \Phi, R)$. In U.S. Pat. No. 8,098,282, the range (distance) is described by text (field of view, FOV). So, the message carried in the absolute angular coordinate system $(\theta, \Phi, H_{FOV})$ in U.S. Pat. No. 8,098,282 is essentially the same as the message carried in the spherical coordinate system $(\theta, \Phi, R)$ in the invention.

At the same time, the image processing unit 14 will determine whether the second X-Y plane coordinates of the four end points A", B", C", D" all are located in the second image I2. As shown in FIG. 5, if the second X-Y plane coordinates of the four end points A", B", C", D" all are located in the second image I2, the image processing unit 14 will control the mask generating unit 12 to generate a second rectangular mask M2 in the second image I2 by a maximum X coordinate value, a maximum Y coordinate value, a minimum X coordinate value and a minimum Y coordinate value of the second X-Y plane coordinates of the four end points A", B", C", D". In this embodiment, provided that the bottom left corner of the second image I2 is the origin, the X and Y coordinate values of the end point A" will be the maximum X and Y coordinate values and the X and Y coordinate values of the end point C" will be the minimum X and Y coordinate values. Accordingly, the image processing unit 14 will control the mask generating unit 12 to generate the second rectangular mask M2 in the second image I2 by the X and Y coordinate values of the end point A" and the X and Y coordinate values of the end point C". Therefore, if the mask deforms to be non-rectangular after pan, tilt and/or zoom operation and the mask has to be limited to rectangular due to hardware painting capability, the invention can ensure that the privacy area will not be exposed by masking more areas.

Figure 6:
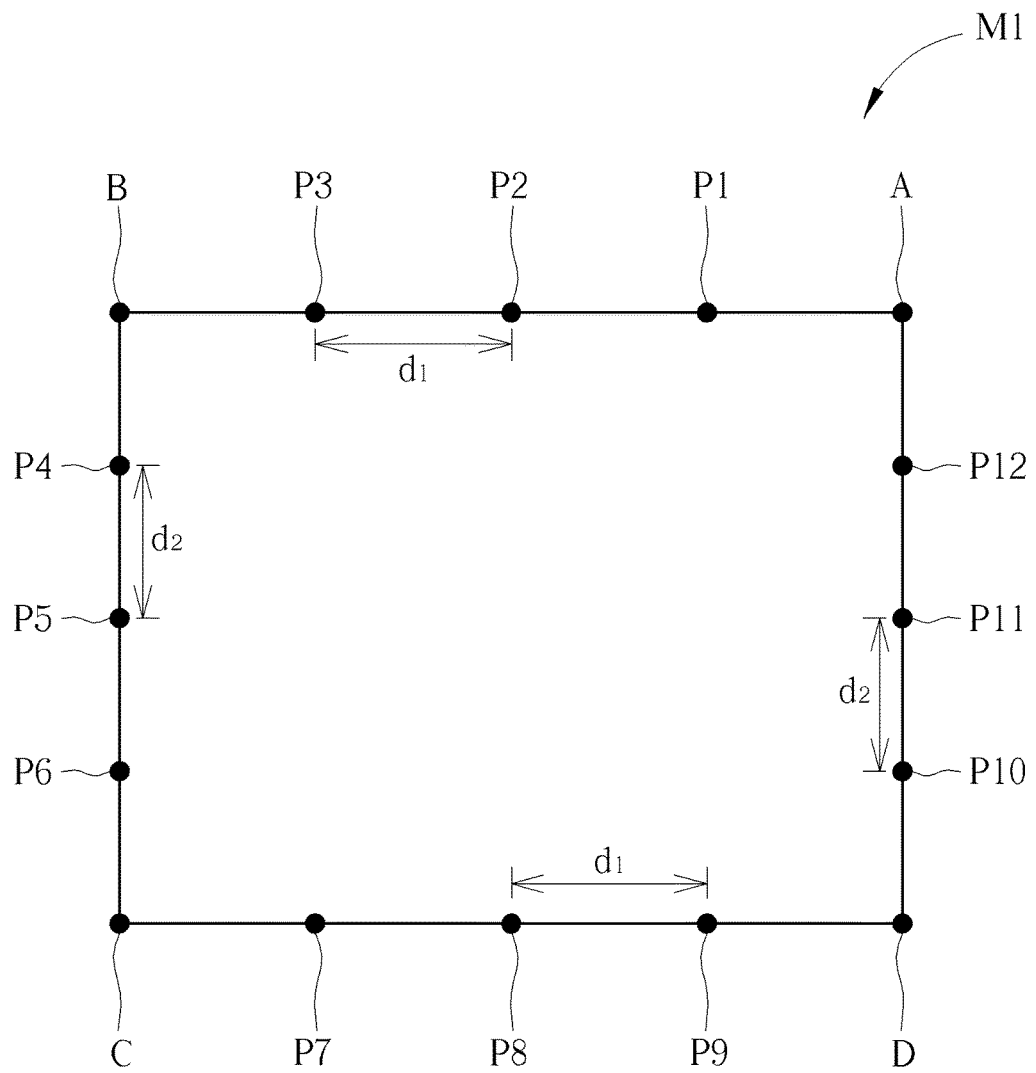
FIG. 6 is a schematic diagram illustrating the first rectangular mask shown in FIG. 2.
Figure 7:
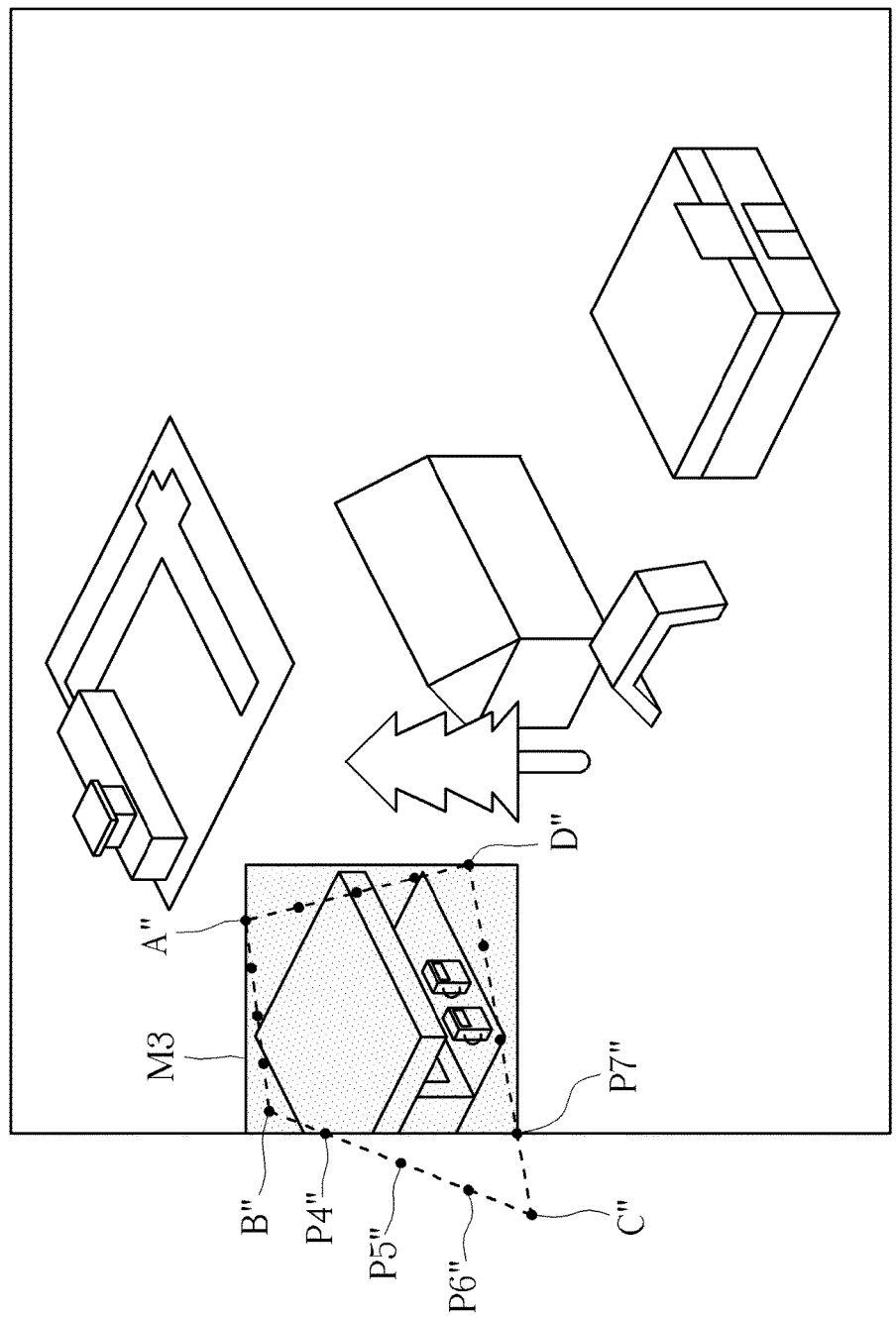
FIG. 7 is a schematic diagram illustrating another second image captured by the camera unit shown in FIG. 1 under a second field of view.

Referring to FIGS. 6 and 7, FIG. 6 is a schematic diagram illustrating the first rectangular mask M1 shown in FIG. 2, and FIG. 7 is a schematic diagram illustrating another second image I2' captured by the camera unit 18 shown in FIG. 1 under a second field of view. As shown in FIG. 6, after the mask generating unit 12 generates the first rectangular mask M1, besides the four end points A, B, C, D, the image processing unit 14 may further convert the first X-Y plane coordinates of a plurality of boundary points P1-P12 of the four boundaries $\overline{AB}$, $\overline{BC}$, $\overline{CD}$, $\overline{DA}$ in the first image I1 into the spherical coordinates. The boundary points P1-P12 correspond to boundary points P1'-P12' of the spherical coordinate system, respectively, wherein the spherical coordinates of the boundary points P1'-P12' are absolute coordinates on the camera unit 18. At the same time, the image processing unit 14 stores the spherical coordinates of the boundary points P1'-P12' in the memory unit 16. After the image obtaining unit 10 obtains the second image I2' captured by the camera unit 18 under a second field of view, the image processing unit 14 will convert the spherical coordinates of the boundary points P1'-P12' into second X-Y plane coordinates corresponding to the second image I2'. The boundary points P1'-P12' correspond to boundary points P1"-P12" in the second image I2, respectively.

In this embodiment, if the second X-Y plane coordinate of at least one end point A", B", C" and/or D" after coordinate conversion is not located in the second image I2', it is assumed that the at least one end point A", B", C" and/or D" is an out-of-bounds point and it is assumed that the other end points A", B", C" and/or D" are in-bounds point. As shown in FIG. 7, the second X-Y plane coordinate of the end point C" is not located in the second image I2' and the second X-Y plane coordinates of the end points A", B", D" are located in the second image I2', so the end point C" is out-of-bounds point and the end points A", B", D" are in-bounds points.

After pan, tilt and/or zoom operation, if at least one out-of-bounds point exists, the image processing unit 14 will find out at least one boundary point located in the second image I2' and close to the at least one out-of-bounds point from the plurality of boundary points P1"-P12". In this embodiment, since the end point C" is out-of-bounds point, the image processing unit 14 will find out at least one boundary point located in the second image I2' and close to the out-of-bounds point C' along the boundaries $\overline{C"B"}$, $\overline{C"D"}$ toward the end points B", D". For example, when the image processing unit 14 determines that the end point C" is out-of-bounds point, the image processing unit 14 will determine whether the second X-Y plane coordinate of the boundary points P6", P7" are located in the second image I2'. As shown in FIG. 7, since the boundary point P7" is located in the second image I2', the boundary point on the boundary $\overline{C"D"}$ close to the endpoint C" is P7". Since the boundary point P6" is not located in the second image I2', the image processing unit 14 will continue to determine whether the second X-Y plane coordinate of the boundary point P5' is located in the second image I2'. Since the boundary point P5" is still not located in the second image I2', the image processing unit 14 will continue to determine whether the second X-Y plane coordinate of the boundary point P4" is located in the second image I2'. Since the boundary point P4" is located in the second image I2', the boundary point on the boundary $\overline{C"B"}$ close to the end point C" is P4".

Then, the processing unit 14 will control the mask generating unit 12 to generate a third rectangular mask M3 in the second image I2' by a maximum X coordinate value, a maximum Y coordinate value, a minimum X coordinate value and a minimum Y coordinate value of the second X-Y plane coordinates of the boundary points P4", P7" and the in-bounds points A", B", D". In this embodiment, provided that the bottom left corner of the second image I2' is the origin, the X coordinate value of the end point D" will be the maximum X coordinate value, the Y coordinate value of the end point A" will be the maximum Y coordinate value, and the X and Y coordinate values of the boundary point P7" will be the minimum X and Y coordinate values. Accordingly, the image processing unit 14 will control the mask generating unit 12 to generate the second rectangular mask M2 in the second image I2' by the X coordinate value of the end point D", the Y coordinate value of the end point A", and the X and Y coordinate values of the boundary point P7". Therefore, if the mask deforms to be non-rectangular after pan, tilt and/or zoom operation, a part of the mask is out of the image, and the mask has to be limited to rectangular due to hardware painting capability, the invention can ensure that the privacy area will not be exposed by masking more areas.

In this embodiment, as shown in FIG. 6, after the mask generating unit 12 generates the first rectangular mask M1, the image processing unit 14 may sample two opposite boundaries $\overline{AB}$, $\overline{CD}$ of the four boundaries $\overline{AB}$, $\overline{BC}$, $\overline{CD}$, $\overline{DA}$ by a first distance d1 and sample the other two opposite boundaries $\overline{BC}$, $\overline{DA}$ of the four boundaries $\overline{AB}$, $\overline{BC}$, $\overline{CD}$, $\overline{DA}$ by a second distance d2, so as to obtain the plurality of boundary points P1-P12. It should be noted that the number of the boundary points P1-P12 and the four end points A, B, C, D is limited by the maximum memory capacity of the memory unit 16 for storing the boundary points and the end points. In other words, the invention may set the first distance d1 and the second distance d2 according to the maximum memory capacity of the memory unit 16 for storing the boundary points and the end points.

In another embodiment, after the mask generating unit 12 generates the first rectangular mask M1, the image processing unit 14 may sample the four boundaries $\overline{AB}$, $\overline{BC}$, $\overline{CD}$, $\overline{DA}$ by a fixed distance d, so as to obtain the aforesaid boundary points. Needless to say, the invention may set the aforesaid fixed distance d according to the maximum memory capacity of the memory unit 16 for storing the boundary points and the end points.

Figure 8:
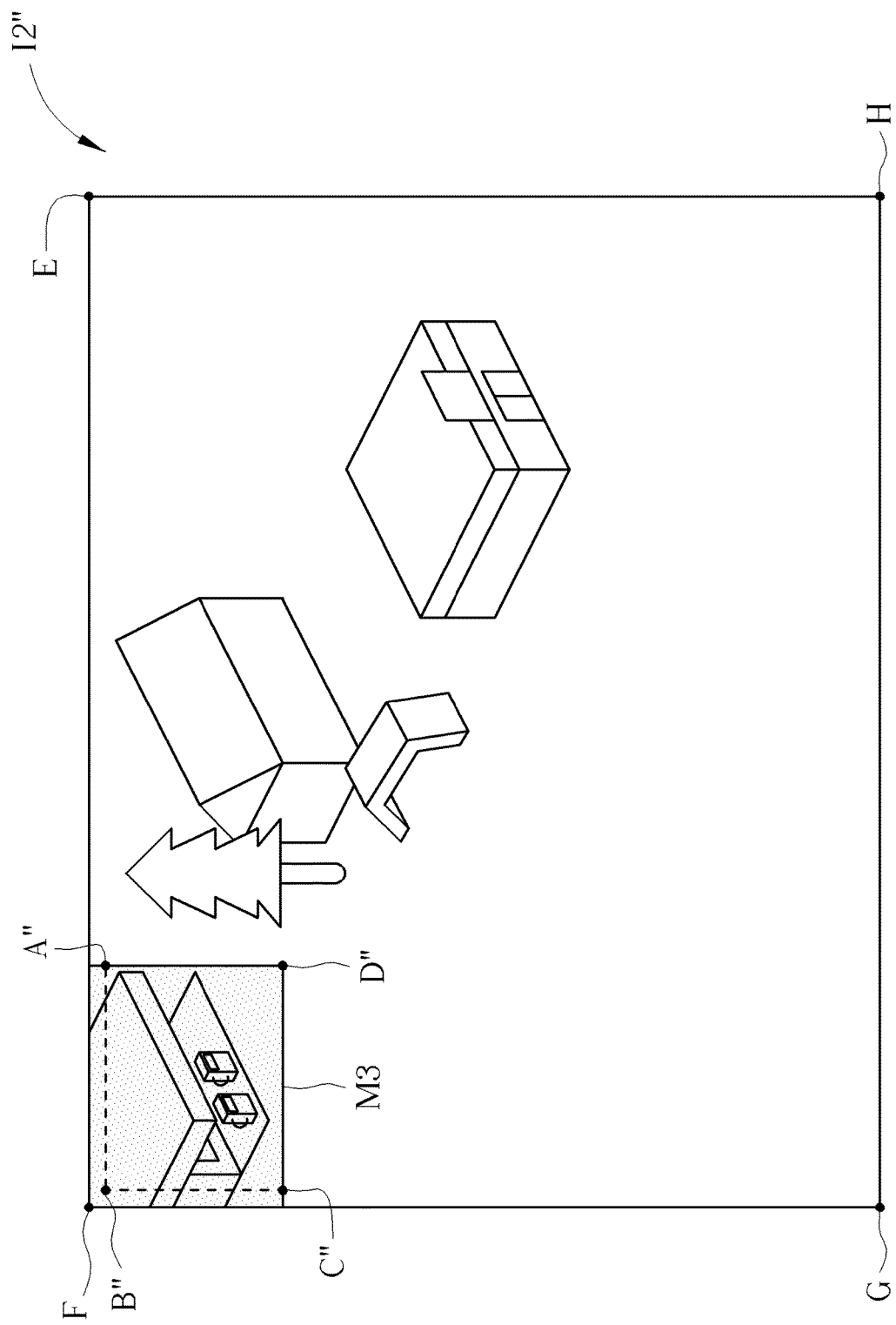
FIG. 8 is a schematic diagram illustrating another second image captured by the camera unit shown in FIG. 1 under a second field of view.

Referring to FIG. 8, FIG. 8 is a schematic diagram illustrating another second image I2" captured by the camera unit 18 shown in FIG. 1 under a second field of view. As shown in FIG. 8, if the distance between the boundary points is too large, the third rectangular mask M3 generated by the aforesaid manner cannot mask the privacy area wholly. Therefore, it can be assumed that two opposite borders $\overline{EF}$, $\overline{GH}$ of four borders $\overline{EF}$, $\overline{FG}$, $\overline{GH}$, $\overline{HE}$ of the second image I2" are a first pair of image borders and the other two opposite borders $\overline{EF}$, $\overline{HE}$ are a second pair of image borders; and it can be assumed that two opposite borders $\overline{A"B"}$, $\overline{C"D"}$ of four borders $\overline{A"B"}$, $\overline{B"C"}$, $\overline{C"D"}$, $\overline{D"A"}$ of the third rectangular mask M3 parallel to the first pair of image borders $\overline{EF}$, $\overline{GH}$ are a first pair of mask borders and the other two opposite borders $\overline{B"C"}$, $\overline{D"A"}$ are a second pair of mask borders. Furthermore, it can be assumed that one of the first pair of mask borders $\overline{A"B"}$, $\overline{C"D"}$ with a shortest distance relative to any one of the first pair of image borders $\overline{EF}$, $\overline{GH}$ is a first approach border and one of the second pair of mask borders $\overline{B''C''}$, $\overline{D''A''}$ with a shortest distance relative to any one of the second pair of image borders $\overline{FG}$, $\overline{HE}$ is a second approach border; and it can be assumed that one of the first pair of image borders $\overline{EF}$, $\overline{GH}$ close to the first approach border is a first user-defined border and one of the second pair of image borders $\overline{FG}$, $\overline{HE}$ close to the second approach border is a second user-defined border. As shown in FIG. 8, the distance between the mask border $\overline{A''B''}$ and the image border $\overline{EF}$ is shortest, so the mask border $\overline{A''B''}$ is the first approach border and the image border $\overline{EF}$ is the first user-defined border. Similarly, the distance between the mask border $\overline{B''C''}$ and the image border $\overline{FG}$ is shortest, so the mask border $\overline{B''C''}$ is the second approach border and the image border $\overline{FG}$ is the second user-defined border.

If the first approach border $\overline{A''B''}$ does not overlap with the first user-defined border $\overline{EF}$, the privacy area may be exposed partially. Similarly, if the second approach border $\overline{B''C''}$ does not overlap with the second user-defined border $\overline{FG}$, the privacy area may be also exposed partially. Accordingly, when the image processing unit 14 determines that the first approach border $\overline{A''B''}$ does not overlap with the first user-defined border $\overline{EF}$, the image processing unit 14 will control the mask generating unit 12 to enlarge the third rectangular mask M3 to make the first approach border $\overline{A''B''}$ overlap with the first user-defined border $\overline{EF}$. Similarly, when the image processing unit 14 determines that the second approach border $\overline{B''C''}$ does not overlap with the second user-defined border $\overline{FG}$, the image processing unit 14 will control the mask generating unit 12 to enlarge the third rectangular mask M3 to make the second approach border $\overline{B''C''}$ overlap with the second user-defined border $\overline{FG}$. Therefore, the invention can ensure that the privacy area will not be exposed even if the distance between the boundary points is too large.

Figure 9:
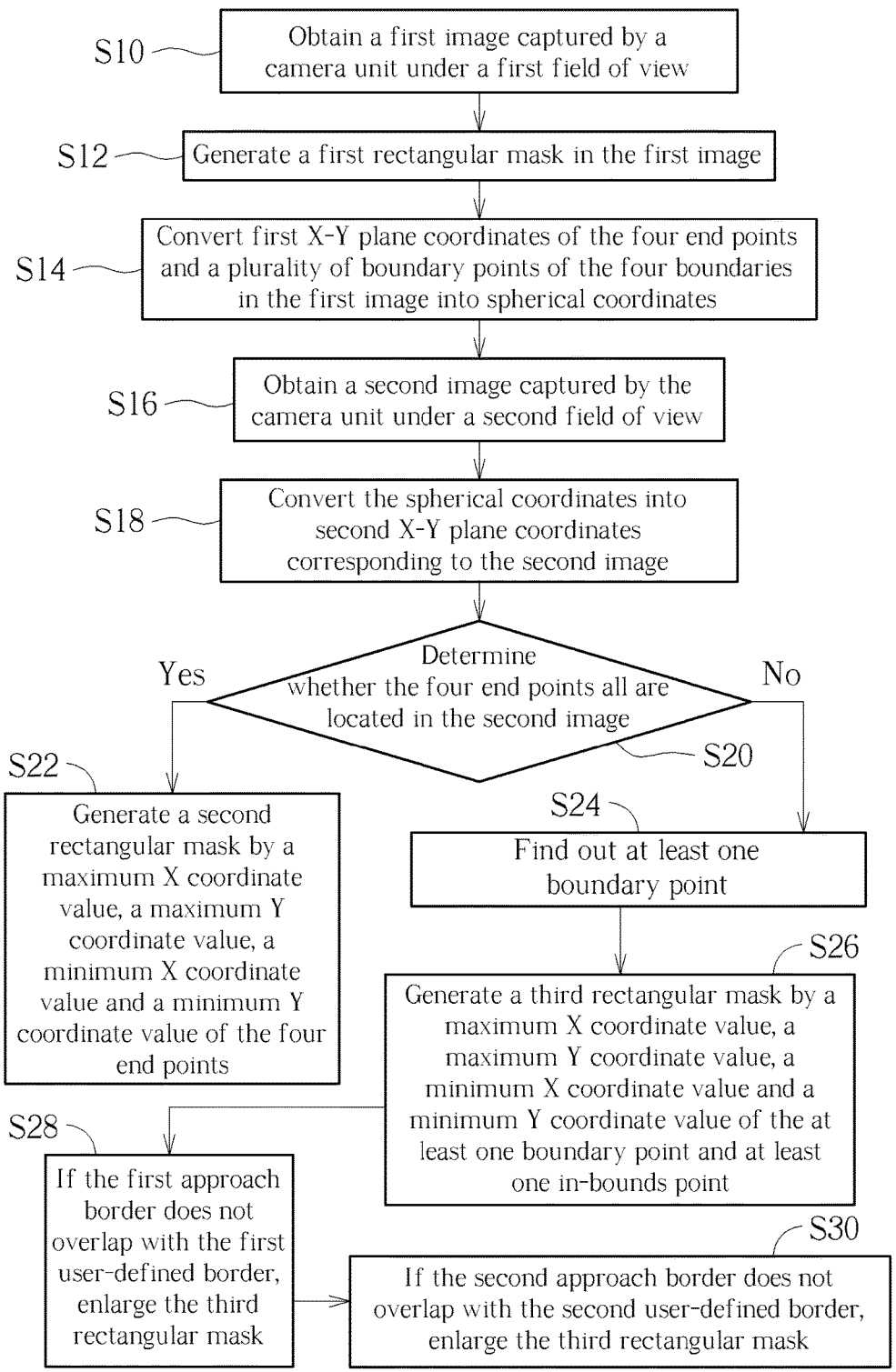
FIG. 9 is a flowchart illustrating an image processing method according to an embodiment of the invention.

Referring to FIG. 9, FIG. 9 is a flowchart illustrating an image processing method according to an embodiment of the invention. The image processing method shown in FIG. 9 can be implemented by the aforesaid image processing device 1. The terms such as in-bounds point, out-of-bounds point, first user-defined border, second user-defined border and so on have the same definition as mentioned in the above and those will not be depicted herein again. First, step S10 is performed to obtain a first image captured by a camera unit under a first field of view. Afterward, step S12 is performed to generate a first rectangular mask in the first image. Then, step S14 is performed to convert first X-Y plane coordinates of the four end points and a plurality of boundary points of the four boundaries in the first image into spherical coordinates. Then, step S16 is performed to obtain a second image captured by the camera unit under a second field of view. Then, step S18 is performed to convert the spherical coordinates into second X-Y plane coordinates corresponding to the second image. Then, step S20 is performed to determine whether the second X-Y plane coordinates of the four end points all are located in the second image.

If the second X-Y plane coordinates of the four end points all are located in the second image, step S22 is performed to generate a second rectangular mask in the second image by a maximum X coordinate value, a maximum Y coordinate value, a minimum X coordinate value and a minimum Y coordinate value of the second X-Y plane coordinates of the four end points.

If at least one out-of-bounds point exists, step S24 is performed to find out at least one boundary point located in the second image and close to the at least one out-of-bounds point from the plurality of boundary points. Then step S26 is performed to generate a third rectangular mask in the second image by a maximum X coordinate value, a maximum Y coordinate value, a minimum X coordinate value and a minimum Y coordinate value of the second X-Y plane coordinates of the at least one boundary point and at least one in-bounds point found out in step S24. If the first approach border does not overlap with the first user-defined border, step S28 is performed to enlarge the third rectangular mask to make the first approach border overlap with the first user-defined border. If the second approach border does not overlap with the second user-defined border, step S30 is performed to enlarge the third rectangular mask to make the second approach border overlap with the second user-defined border.

It should be noted that the detailed embodiments of the image processing method of the invention are mentioned in the above and those will not be depicted herein again. Furthermore, the image processing method shown in FIG. 9 may be implemented by software, firmware and/or hardware. The image processing method may be executed in a camera, a monitor or other electronic devices with pan, tilt and zoom function.

As mentioned in the above, after the field of view changes, the invention determines whether the four end points of the rectangular mask all are located in the image, so as to generate the appropriate rectangular mask in the image. If the X-Y plane coordinates of the four end points all are located in the image, the invention generates the rectangular mask in the image by the maximum X coordinate value, the maximum Y coordinate value, the minimum X coordinate value and the minimum Y coordinate value of the X-Y plane coordinates of the four end points. Furthermore, if at least one out-of-bounds point exists, the invention finds out at least one boundary point located in the image and close to the at least one out-of-bounds point and then generates the rectangular mask in the image by the maximum X coordinate value, the maximum Y coordinate value, the minimum X coordinate value and the minimum Y coordinate value of the X-Y plane coordinates of the at least one boundary point and at least one in-bounds point. Accordingly, the invention can generate the appropriate rectangular mask in the image according to different field of views.

Still further, if the mask border of the rectangular mask does not overlap with the nearby image border of the image, the invention can further enlarge the rectangular mask to make the mask border of the rectangular mask overlap with the nearby image border of the image. Accordingly, when a part of the privacy area exceeds the image due to the change of the field of view, the invention still can ensure that the privacy area is not exposed around the border of the image.

Moreover, the invention can sample the four boundaries of the rectangular mask by the fixed distance or different distances, so as to obtain the boundary points. Accordingly, the invention can further reduce computation load and save memory capacity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An image processing method comprising steps of:
obtaining a first image captured by a camera unit under a first field of view;

generating a first rectangular mask in the first image, wherein the first rectangular mask has four end points and four boundaries connecting the four end points;

converting first X-Y plane coordinates of the four end points in the first image into spherical coordinates;

obtaining a second image captured by the camera unit under a second field of view;

converting the spherical coordinates into second X-Y plane coordinates corresponding to the second image;

determining whether the second X-Y plane coordinates of the four end points all are located in the second image; and if the second X-Y plane coordinates of the four end points all are located in the second image, generating a second rectangular mask in the second image by a maximum X coordinate value, a maximum Y coordinate value, a minimum X coordinate value and a minimum Y coordinate value of the second X-Y plane coordinates of the four end points;

wherein the image processing method further comprises steps of:

converting the first X-Y plane coordinates of a plurality of boundary points of the four boundaries in the first image into the spherical coordinates;

if the second X-Y plane coordinate of at least one end point is not located in the second image, assuming that the at least one end point is an out-of-bounds point and assuming the other end points are in-bounds point;

if at least one out-of-bounds point exists, finding out at least one boundary point located in the second image and close to the at least one out-of-bounds point from the plurality of boundary points; and generating a third rectangular mask in the second image by a maximum X coordinate value, a maximum Y coordinate value, a minimum X coordinate value and a minimum Y coordinate value of the second X-Y plane coordinates of the at least one boundary point and at least one in-bounds point.

2. The image processing method of claim 1, further comprising steps of:

assuming that two opposite borders of four borders of the second image are a first pair of image borders and the other two opposite borders of the four borders of the second image are a second pair of image borders;

assuming that two opposite borders of four borders of the third rectangular mask parallel to the first pair of image borders are a first pair of mask borders and the other two opposite borders of the four borders of the third rectangular mask are a second pair of mask borders;

assuming that one of the first pair of mask borders with a shortest distance relative to any one of the first pair of image borders is a first approach border and one of the second pair of mask borders with a shortest distance relative to any one of the second pair of image borders is a second approach border;

assuming that one of the first pair of image borders close to the first approach border is a first user-defined border and one of the second pair of image borders close to the second approach border is a second user-defined border;

if the first approach border does not overlap with the first user-defined border, enlarging the third rectangular mask to make the first approach border overlap with the first user-defined border; and if the second approach border does not overlap with the second user-defined border, enlarging the third rectangular mask to make the second approach border overlap with the second user-defined border.

3. The image processing method of claim 1, further comprising step of:

after generating the first rectangular mask, sampling the four boundaries by a fixed distance, so as to obtain the plurality of boundary points.

4. The image processing method of claim 1, further comprising step of:

after generating the first rectangular mask, sampling two opposite boundaries of the four boundaries by a first distance and sampling the other two opposite boundaries of the four boundaries by a second distance, so as to obtain the plurality of boundary points.

5. An image processing device comprising:

an image obtaining unit obtaining a first image captured by a camera unit under a first field of view;

a mask generating unit generating a first rectangular mask in the first image, the first rectangular mask having four end points and four boundaries connecting the four end points;

an image processing unit electrically connected to the image obtaining unit and the mask generating unit, the image processing unit converting first X-Y plane coordinates of the four end points in the first image into spherical coordinates;

wherein the image obtaining unit obtains a second image captured by the camera unit under a second field of view; the image processing unit converts the spherical coordinates into second X-Y plane coordinates corresponding to the second image and determines whether the second X-Y plane coordinates of the four end points all are located in the second image; if the second X-Y plane coordinates of the four end points all are located in the second image, the image processing unit generates a second rectangular mask in the second image by a maximum X coordinate value, a maximum Y coordinate value, a minimum X coordinate value and a minimum Y coordinate value of the second X-Y plane coordinates of the four end points;

wherein the image processing unit converts the first X-Y plane coordinates of a plurality of boundary points of the four boundaries in the first image into the spherical coordinates; if the second X-Y plane coordinate of at least one end point is not located in the second image, the at least one end point is assumed to be an out-of-bounds point and the other end points are assumed to be in-bounds point if at least one out-of-bounds point exists, the image processing unit finds out at least one boundary point located in the second image and close to the at least one out-of-bounds point from the plurality of boundary points; the image processing unit generates a third rectangular mask in the second image by a maximum X coordinate value, a maximum Y coordinate value, a minimum X coordinate value and a minimum Y coordinate value of the second X-Y plane coordinates of the at least one boundary point and at least one in-bounds point.

6. The image processing device of claim 5, wherein two opposite borders of four borders of the second image are assumed to be a first pair of image borders and the other two opposite borders of the four borders of the second image are assumed to be a second pair of image borders; two opposite borders of four borders of the third rectangular mask parallel to the first pair of image borders are assumed to be a first pair of mask borders and the other two opposite borders of the four borders of the third rectangular mask are assumed to be a second pair of mask borders; one of the first pair of mask borders with a shortest distance relative to any one of the first pair of image borders is assumed to be a first approach border and one of the second pair of mask borders with a shortest distance relative to any one of the second pair of image borders is assumed to be a second approach border; one of the first pair of image borders close to the first approach border is assumed to be a first user-defined border and one of the second pair of image borders close to the second approach border is assumed to be a second user-defined border; if the first approach border does not overlap with the first user-defined border, the image processing unit controls the mask generating unit to enlarge the third rectangular mask to make the first approach border overlap with the first user-defined border; if the second approach border does not overlap with the second user-defined border, the image processing unit controls the mask generating unit to enlarge the third rectangular mask to make the second approach border overlap with the second user-defined border.

7. The image processing device of claim 5, wherein after the mask generating unit generates the first rectangular mask, the image processing unit samples the four boundaries by a fixed distance, so as to obtain the plurality of boundary points.

8. The image processing device of claim 5, wherein after the mask generating unit generates the first rectangular mask, the image processing unit samples two opposite boundaries of the four boundaries by a first distance and samples the other two opposite boundaries of the four boundaries by a second distance, so as to obtain the plurality of boundary points.

* * * * *